(12) United States Patent
Ono

(10) Patent No.: US 6,934,251 B2
(45) Date of Patent: Aug. 23, 2005

(54) PACKET SIZE CONTROL TECHNIQUE

(75) Inventor: Yoshihiro Ono, Tokyo (JP)

(73) Assignee: NEC Corporation, Tokyo (JP)

(*) Notice: Subject to any disclaimer, the term of this patent is extended or adjusted under 35 U.S.C. 154(b) by 788 days.

(21) Appl. No.: 09/791,210

(22) Filed: Feb. 23, 2001

(65) Prior Publication Data
US 2001/0015956 A1 Aug. 23, 2001

(30) Foreign Application Priority Data
Feb. 23, 2000 (JP) ........................................ 2000-045299

(51) Int. Cl.⁷ ............................................. G01R 31/08
(52) U.S. Cl. ........................ 370/229; 370/230; 370/232
(58) Field of Search ................................. 370/229, 230, 370/230.1, 231, 232, 233, 234, 235

(56) References Cited

U.S. PATENT DOCUMENTS

| | | | | |
|---|---|---|---|---|
| 6,215,769 B1 | * | 4/2001 | Ghani et al. | 370/230 |
| 6,298,041 B1 | * | 10/2001 | Packer | 370/231 |
| 6,438,101 B1 | * | 8/2002 | Kalampoukas et al. | 370/229 |
| 6,493,316 B1 | * | 12/2002 | Chapman et al. | 370/231 |
| 6,560,243 B1 | * | 5/2003 | Mogul | 370/468 |
| 6,621,799 B1 | * | 9/2003 | Kemp et al. | 370/282 |
| 6,643,259 B1 | * | 11/2003 | Borella et al. | 370/231 |
| 6,757,255 B1 | * | 6/2004 | Aoki et al. | 370/252 |

FOREIGN PATENT DOCUMENTS

| | | |
|---|---|---|
| JP | 61-264838 | 11/1986 |
| JP | 63-92140 | 4/1988 |
| JP | 7-79250 | 3/1995 |
| JP | 7-226773 | 8/1995 |
| JP | 9-116572 | 5/1997 |
| JP | 9-186739 | 7/1997 |
| JP | 9-247209 | 9/1997 |
| JP | 11-127163 | 5/1999 |
| JP | 11-163938 | 6/1999 |
| JP | 11-225166 | 8/1999 |

* cited by examiner

Primary Examiner—Phirin Sam
(74) Attorney, Agent, or Firm—Scully, Scott, Murphy & Presser

(57) ABSTRACT

A packet size control method allowing reduction in the period of time during which transmission is in a blocked state is disclosed. The size of a packet to be sent is determined depending on a measured round trip time (RTT), a current bandwidth of the data link layer, and a current congestion window size. First, a maximum segment size (MSS) is obtained based on the measured RTT and the current bandwidth of the data link layer using a table obtained by data transfer simulation. Thereafter, the obtained MSS is corrected using the current congestion window size. And the correct MSS is used to determine the final segment of data to be sent.

3 Claims, 5 Drawing Sheets

BUFFER SIZE=16x1024bytes

PACKET SIZE CONTROL TECHNIQUE

BACKGROUND OF THE INVENTION

1. Field of the Invention

The present invention relates to a packet size control method and apparatus in a packet transfer system.

2. Description of the Related Art

In data transmission through a network having a relatively large transfer delay, there has been known a problem such that the sending processing is blocked during a time period from transmission of a send window of data until reception of an acknowledgment (ACK) from a receiving side in the case where the product of bandwidth (or transfer rate) and round trip time (RTT) that is a delay time required for data round trip is greater than the size of a send window. This makes it difficult to use available network bandwidth effectively and enable data transfer with efficient throughput.

One of conventional techniques to solve this problem has been disclosed in Japanese Patent Application Unexamined Publication No. 09-247209. This prior art offers a system in which the transfer delay of a network is converted to a virtual window size, and the virtual window size is added to the send window size to create a new send window size, whereby data transfer can be performed in the new send window size without receiving the ACK. This is how the prior art attempts to avoid the blocking of the transmission processing.

As another technique, Japanese Patent Application Unexamined Publication No. 11-127163 discloses such a window control method as to use the least, from among the idle capacity of a transmitting/receiving buffer, the idle capacity of a receiving buffer, and the product of maximum available band and delay time (round trip time), as the maximum window size. In this method, the maximum available band is determined according to conventional resource reservation protocol.

This type of prior art is also disclosed in Japanese Patent Application Unexamined Publication Nos. 11-225166, 09-116572 and 61-264838.

When using the above-mentioned technique disclosed in Japanese Patent Application Unexamined Publication No. 09-247209, the send window size may exceed an actual receiving buffer size prepared on the receiving side. There occurs no trouble as long as the receiving side performs data receiving processing without any delay at a rate equal to or higher than that at which data arrive. However, the receiving side may temporarily delay the receiving processing to cause interrupt of data processing in the receiving buffer. Further, an error in transmitting data may be caused by noise on the network to close a certain amount of receiving buffer area for an erroneous segment size of transfer data for re-transmission processing. In these cases, part of data sent from the sending side exceeds the storage capacity of the receiving buffer, which may cause unnecessary re-transmission processing for a segment of correct incoming data.

A send window has to make sure that the receiving side can perform reception processing securely in the transfer process. However, if the transmitting side unilaterally up-sizes the send window as in the technique disclosed in the above-mentioned publication, the receiving side may not be able to receive part of data. The above-mentioned other prior art techniques also put an emphasis on how to calculate the data size and disclose no effective solution to this problem.

SUMMARY OF THE INVENTION

It is therefore an object of the present invention to provide a packet size control method and device allowing reduction in the period of time during which transmission is in a blocked state, which may occur in a case where a full send window of data is transmitted. In other words, the present invention provides a packet size control method capable of improving data transfer throughput.

According to the present invention, the size of a packet to be sent is determined depending on a measured round trip time (RTT), a current bandwidth of the data link layer, and a current congestion window size. More specifically, a maximum segment size (MSS) is obtained based on the measured RTT value and the current bandwidth of the data link layer. Thereafter, the obtained MSS is corrected using the current congestion window size. And the correct MSS is used to determine the final segment of data to be sent.

According to an aspect of the present invention, a method for controlling a packet size of data to be sent based on an acknowledgment from a receiving side, includes the steps of: a) measuring a round trip time based on the acknowledgement received from the receiving side; and b) determining a packet size of data to be sent based on the measured round trip time, a current bandwidth of a data link layer, and a current congestion window size.

The step (b) may include the steps of: b.1) determining a maximum segment size depending on the measured round trip time and the current bandwidth of the data link layer, wherein the maximum segment size is determined so as to provide a maximum average data transfer throughput; and b.2) limiting the maximum segment size to the current congestion window size to produce the packet size of data to be sent.

In the step (b.1), the maximum segment size may be determined according to a predetermined relationship among a round trip time, a bandwidth of the data link layer, and an average data transfer throughput for each of a plurality of possible maximum segment sizes, wherein the predetermined relationship is previously obtained by performing data transfer simulation for each of the possible maximum segment sizes.

In an embodiment of the present invention, a largest one among the possible maximum segment sizes is selected when the measured round trip time is not greater than a predetermined value, and a smallest one among the possible maximum segment sizes is selected when the measured round trip time is greater than the predetermined value for a bandwidth of the data link layer.

According to another aspect of the present invention, a method for controlling a packet size of data to be sent based on an acknowledgment from a receiving side, includes the steps of: a) measuring a round trip time based on the acknowledgement received from the receiving side; b) determining a maximum segment size depending on the measured round trip time and the current bandwidth of the data link layer, wherein the maximum segment size is determined so as to provide a maximum average data transfer throughput; c) updating a send window size so as to limit it to a current congestion window size; d) determining whether the maximum segment size becomes not greater than a not-yet-sent data size and the send window size within a predetermined timeout; and e) when the maximum segment size becomes not greater than the not-yet-sent data size and the send window size within the predetermined timeout or the predetermined timeout occurs, selecting a minimum one among the maximum segment size, the not-yet-sent data size, and the send window size as a packet size of data to be sent.

According to still another aspect of the present invention, a device for controlling a packet size of data to be sent based on an acknowledgment from a receiving side, includes: a send data buffer for storing transfer data received from outside; a window controller for controlling a send window size and a congestion window size of the transfer data stored in the send data buffer; a round trip time measuring section for measuring a round trip time by starting a timer when a packet is sent to the receiving side and stopping the timer when the acknowledgement for the packet is received from the receiving side; and a packet size determiner for determining a packet size of data to be sent based on the measured round trip time, a current bandwidth of a data link layer, and a current congestion window size.

The packet size determiner may determine a maximum segment size depending on the measured round trip time and the current bandwidth of the data link layer, wherein the maximum segment size is determined so as to provide a maximum average data transfer throughput, and limits the maximum segment size to the current congestion window size to produce the packet size of data to be sent.

The packet size determiner preferably includes a table containing a predetermined relationship among a round trip time, a bandwidth of the data link layer, and an average data transfer throughput for each of a plurality of possible maximum segment sizes, wherein the predetermined relationship is previously obtained by performing data transfer simulation for each of the possible maximum segment sizes, wherein the maximum segment size is determined by referring to the table.

DETAILED DESCRIPTION OF THE PREFERRED EMBODIMENT

Hereinafter, description will be made about an embodiment of the present invention with reference to the accompanying drawings.

Figure 1:
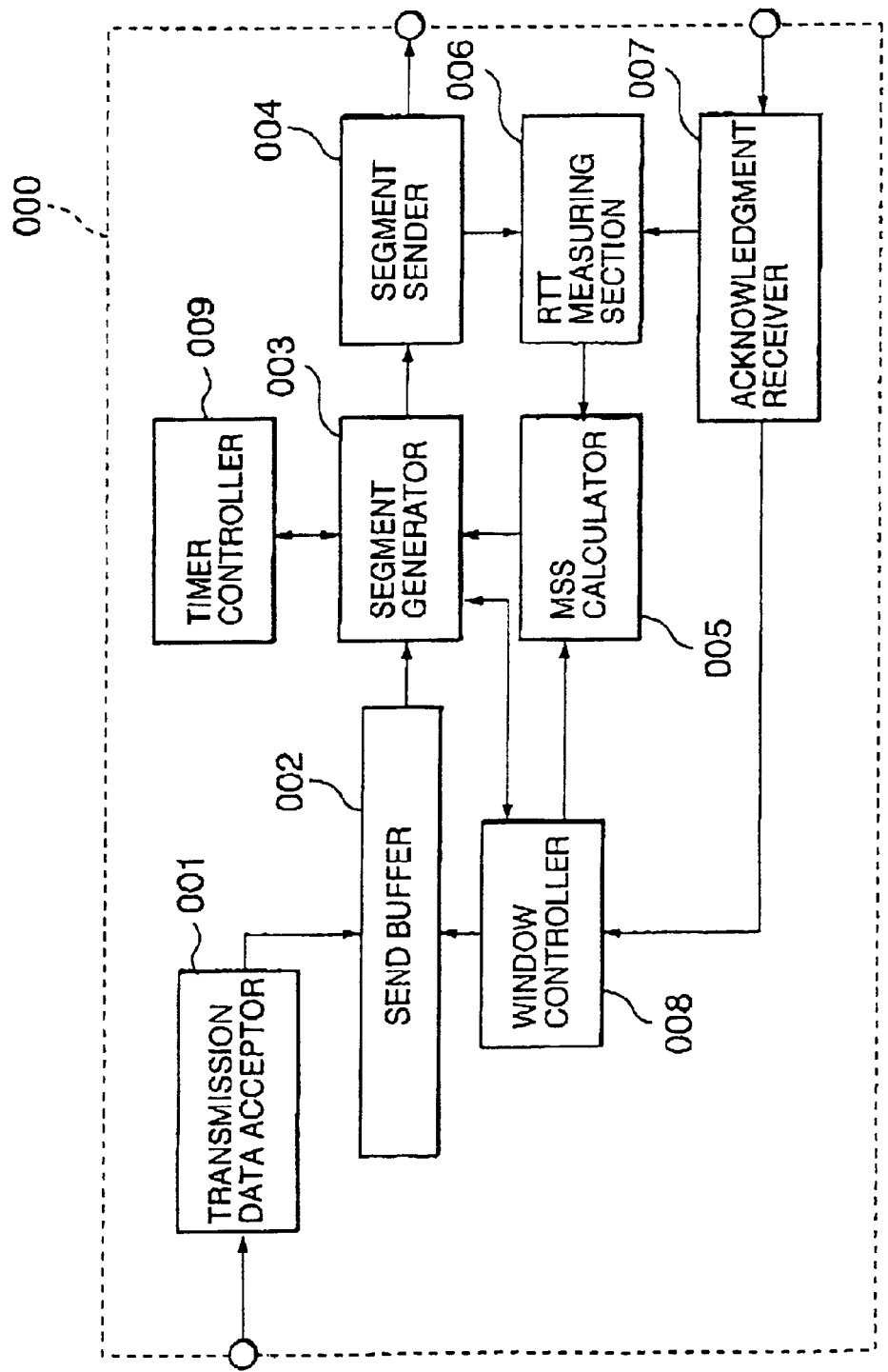
FIG. 1 is a diagram showing a configuration of a packet size control apparatus according to an embodiment of the present invention.

FIG. 1 shows a transport-layer protocol processing block 000 employing a packet data transfer method according to the present invention. Here, a block for re-transmission control is omitted from the processing block because no description thereof is needed for the embodiment. Of course, the transport-layer protocol processing block may perform re-transmission control in the packet data transfer method according to the present invention.

Referring to FIG. 1, the transport-layer protocol processing block 000 includes a send data acceptor 001, a send buffer 002, a segment generator 003, a segment sender 004, an MSS (Maximum Segment Size) calculator 005, an RTT measuring section 006, an acknowledgment receiver 007, a window controller 008, and a timer controller 009.

In operation, send data is received from the outside of the processing block 000 to the send data acceptor 001. The send data acceptor 001 writes the received send data into the send buffer 002. The segment generator 003 generates segments to be sent from data stored in the send buffer 002 on the basis of information obtained from the window controller 008 and the MSS calculator 005. The timer controller 009 accepts a timer setting request from the segment generator 003 and notifies the segment generator 003 of a timeout.

The segment sender 004 sequentially sends the segments generated by the segment generator 003 to a lower layer of the transport-layer protocol processing block 000. The RTT measuring section 006 starts time measurement when the segment sender 004 starts send processing, and finishes time measurement when the acknowledgment receiver 007 receives an acknowledgment. The MSS calculator 005 determines an optimum MSS value on the basis of the RTT value, a value of the bandwidth of a data link layer, and a value of congestion window cwnd obtained from the window controller 008, which will be described later.

The bandwidth of the data link layer is given from the data link layer as appropriate, for example, one of 16 kbps, 64 kbps, and 384 kbps. The acknowledgment receiver 007 receives an acknowledgment from the lower layer to notify the RTT measuring section 006 and the window controller 008 of the acknowledgment. The window controller 008 performs window control of the transfer data stored in the send buffer 002 on the basis of the send window size.

OPTIMUM SEGMENT SIZE CALCULATION

The following describes how to calculate an optimum maximum segment size at the MSS calculator 005. As mentioned above, the size of a packet to be sent is finally determined on the basis of a measured RTT value, a value of the bandwidth of the data link layer, and the size of a congestion window cwnd obtained by the window controller 008. A maximum segment size (MSS) is obtained based on the measured RTT value and a current bandwidth of the data link layer and then the obtained MSS is corrected using the current congestion window size cwnd. And the correct MSS is used to determine the final segment of data to be sent.

More specifically, if the send/receive buffer size (generally constant in each system) and the bandwidth of the data link layer concerned are provided, then a plurality of curves on a plane defined by RTT and throughput respectively as the abscissa and ordinate can be plotted for each of possible maximum segment sizes (MSSs). These curves are determined by theoretical calculation or simulation of the data transfer processing. Referring to these curves, an MSS value is determined using the measured RTT value and the value of the bandwidth of the data link layer as parameters.

The congestion window size cwnd is used here as a upper limit threshold of a possible MSS value. To be more specific, the MSS value determined depending on the bandwidth of the data link layer and the measured RTT is compared with the congestion window size. If the MSS is greater than the congestion window size, the MSS value is reduced to a value smaller than the congestion window size. In this manner, a final MSS value is obtained as an optimum MSS.

Figure 5:
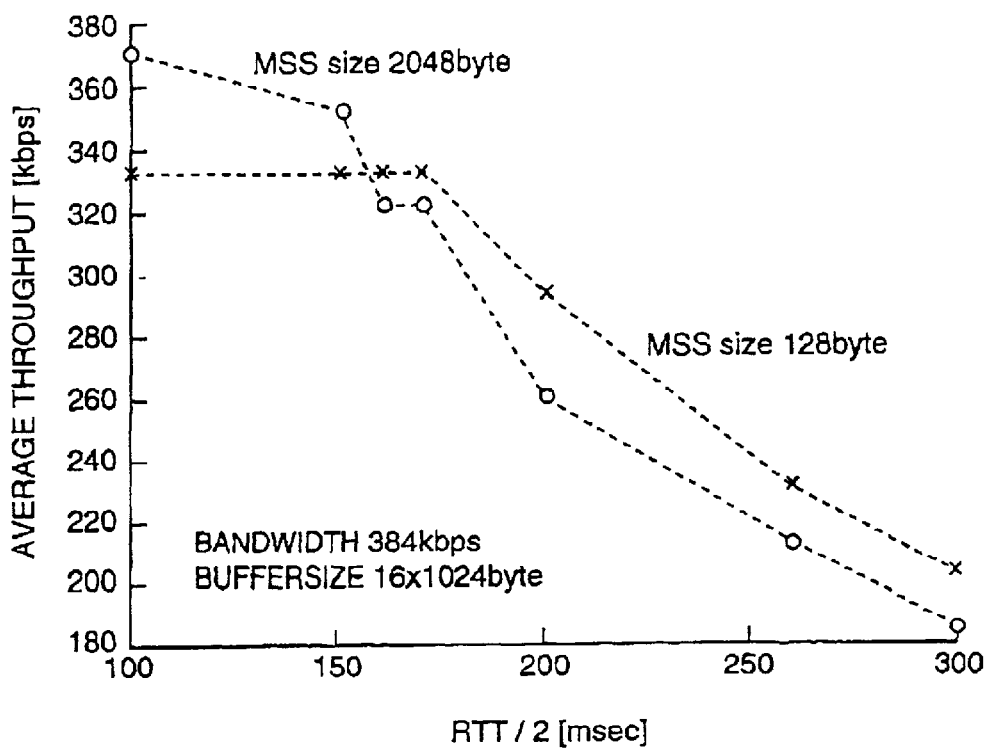
FIG. 5 is a diagram showing characteristics of throughput relative to transfer delay time.

As an example of such an MSS calculation process, FIG. 5 shows average throughput in the case where a simulation is done with 2.4 MB of transfer data using TCP (Transmission Control Protocol), choosing throughput and transfer delay time as the ordinate and abscissa, respectively. The transfer delay time represents one-way time of the RTT, that is, half the RTT corresponds to the transfer delay time.

Suppose that the bandwidth of the data link layer is 384 kbps and the send and receive buffer size is 16×1024 bytes. Here, the send buffer size is set to be equal to the maximum send window size. Suppose further that slow start is not performed. Then, for 128 bytes of MSS size (a characteristic curve with crosses) and 2048 bytes of MSS size (a characteristic curve with circles), data transfer is done while varying the transfer delay time on the abscissa to measure their average throughputs.

As shown, when the transfer delay time is equal to or less than 150 msec, 2048 bytes of MSS size indicated with circles exhibits throughput values larger than those of 128 bytes of MSS size indicated with crosses. On the other hand, if the transfer delay time exceeds approximately 160 msec, this relation is reversed to make the throughput values of 128 bytes of MSS size larger. It is apparent from this simulation that the MSS size for optimize throughput varies with the RTT. Thus, a MSS size for maximizing throughput can be determined by referring to the bandwidth of the data link layer and the RTT.

In other words, if RTT is long, the MSS size is made smaller to increase throughput. In this case, the frequency at acknowledgments are received from the receiving side is increased, resulting in a reduced period of time for a blocked state. On the other hand, if RTT is short, the MSS size could be set larger to increase throughput. In the case where the MSS size is set larger, a full send window of data may be transmitted. In this case, the smaller the MSS size, the more the amount of wasted space in the communication channel grows due to the header of the transfer protocol. Therefore, the MSS size is set to a larger value when RTT is short.

One of methods of determining MSS is to use a table obtained from the characteristic curves as shown in FIG. 5

Figure 6:
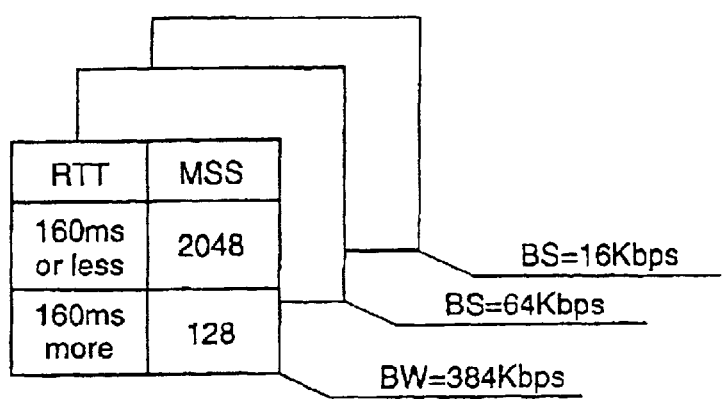
FIG. 6 is a diagram showing a table used to determine MSS providing a better transfer efficiency.

As shown in FIG. 6, a table for each of bandwidths (e.g. 16 kbps, 64 kbps, and 384 kbps) of the data link layer can be created from the characteristic curves as shown in FIG. 5. By referring to the table of FIG. 6, a MSS size for maximizing throughput can be determined.

In addition, as mentioned above, the congestion window size is used as an upper limit threshold of a possible MSS value. Assuming that two MSS sizes of 128 and 2048 bytes are used, if the congestion window size is 1024 bytes, then the final MSS size will be set to 128 bytes.

OPERATION

Figure 2:
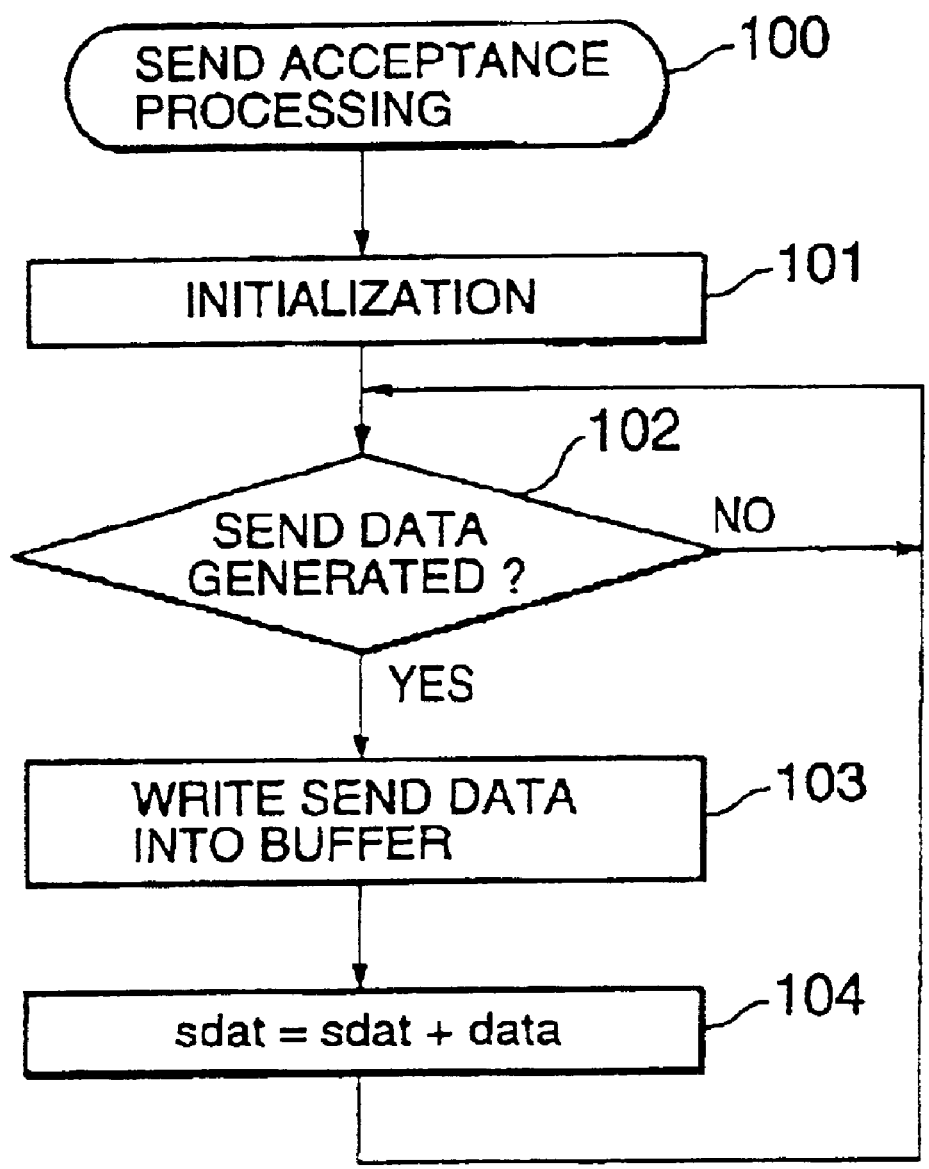
FIG. 2 is a flowchart showing transmission acceptance processing in the embodiment.
Figure 3:
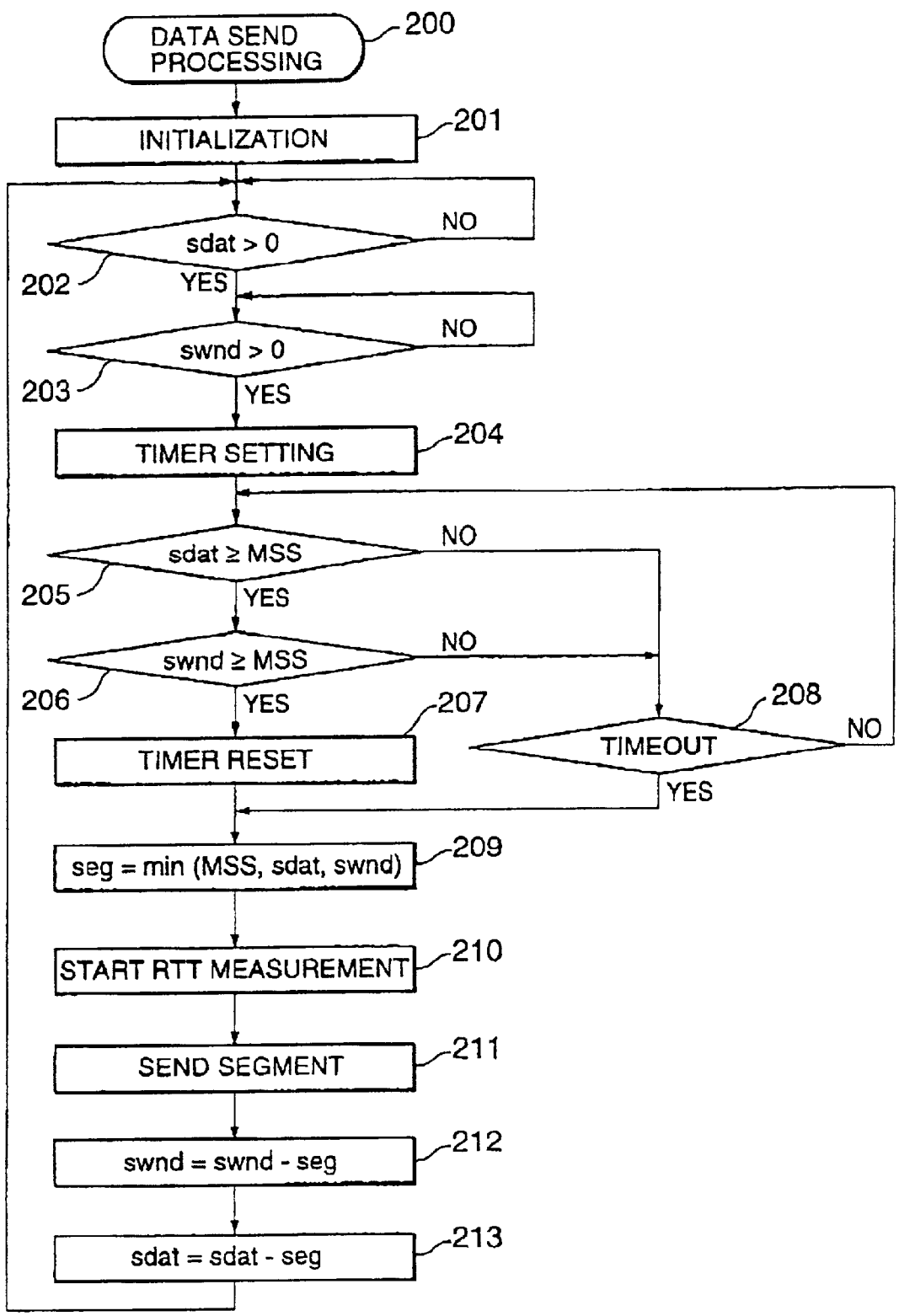
FIG. 3 is a flowchart showing data transmission processing in the embodiment.
Figure 4:
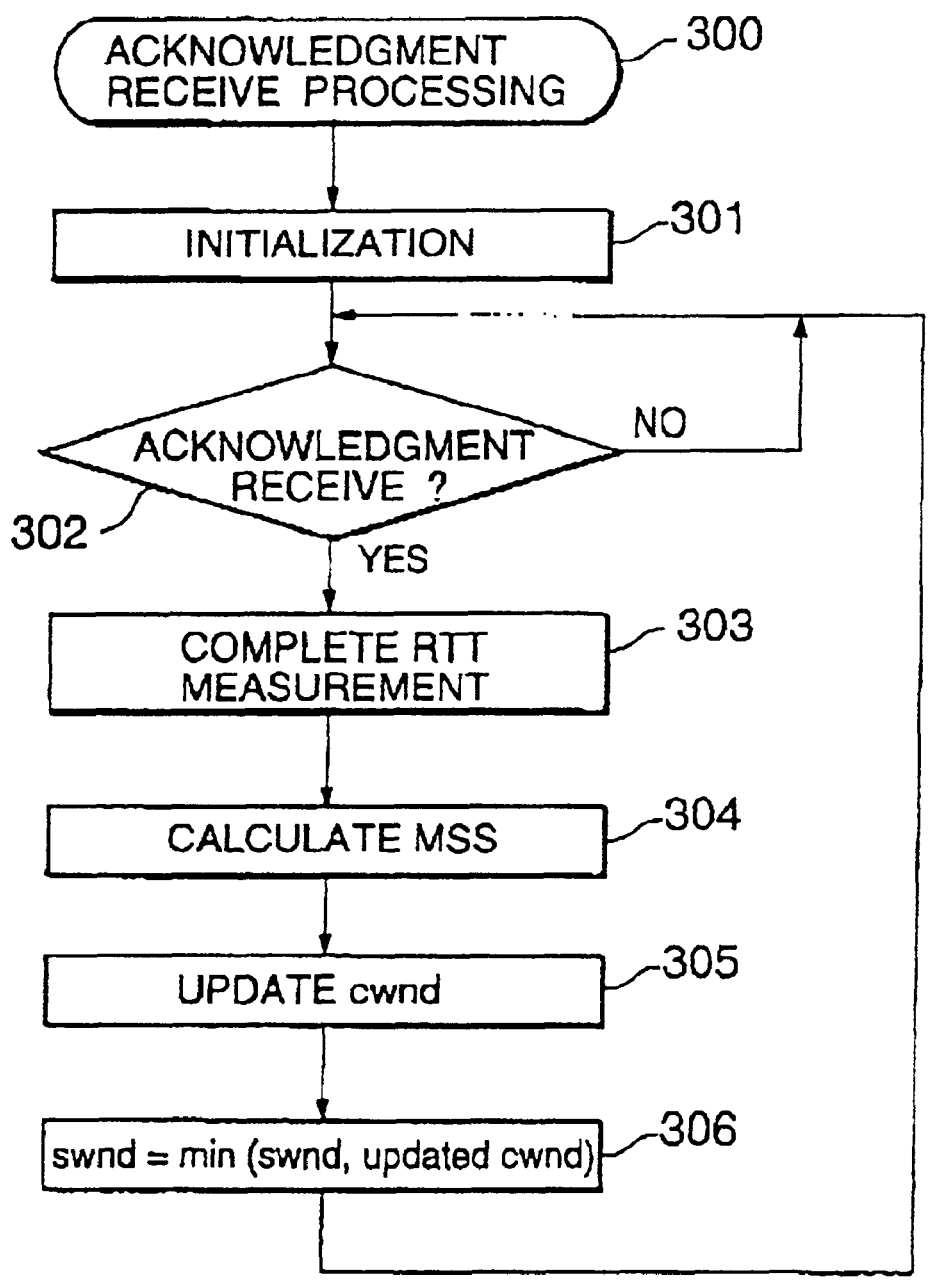
FIG. 4 is a flowchart showing acknowledgment processing in the embodiment.

FIGS. 2 through 4 are flowcharts showing three processes (send acceptance processing, data send processing and acknowledgment processing) which independently execute process flows. It should be noted that a flowchart of re-send control processing is omitted here because no description thereof is needed for the embodiment. Of course, the transport-layer protocol processing using the packet data transfer method according to the present invention may include re-transmission control.

Referring to FIG. 2, initialization is made at the time of system start-up (step 101). Then, it is determined whether send data is present (step 102). If no send data is present (NO at step 102), the step 102 is repeated until send data is received. When send data is received (YES at step 102), the send data is written into the send buffer 002 (step 103) and then the window controller 008 increments a variable sdat indicative of the size of data that have not been sent by the size data of the send data written in the buffer 002 (step 104).

Referring to FIG. 3, the data send processing 200 will be described. First, initialization is made at the time of system start-up (step 201). Then, it is determined whether the variable sdat indicative of the not-yet-sent data size is greater than 0 (step 202). The step 202 is repeated until the variable sdat is greater than 0. When the variable sdat is greater than 0 (YES at step 102), it is further determined whether a variable swnd indicative of a send window size in the window controller 008 is greater than 0 (step 203). The step 203 is repeated until the variable swnd is greater than 0.

When the variable swnd is greater than 0 (YES at step 203), the timer controller 009 sets the timer (step 204) and then it is determined whether the not-yet-sent data size sdat is equal to or greater than the MSS value (step 205). When the not-yet-sent data size sdat is equal to or greater than the MSS value (YES at step 205), It is further determined whether the variable swnd is equal to or greater than the MSS value (step 206). If the variable swnd is equal to or greater than the MSS value (YES at step 206), the timer is reset (step 207) and the operating procedure advances to step 209.

When the not-yet-sent data size sdat is smaller than the MSS value (NO at step 205), it is determined whether a timeout occurs, that is, timeout notification is received from the timer controller 009 (step 208). When no timeout occurs (NO at step 208), the control goes back to the step 205. Similarly, when the variable swnd is smaller than the MSS value (NO at step 206), it is determined whether a timeout occurs (step 208). When no timeout occurs (NO at step 208), the control goes back to the step 205.

If the step 103 of writing new send data into the send buffer 002 (see FIG. 2) is executed until the timeout occurs (step 208) and thereby the not-yet-sent data size sdat becomes equal to or larger than the MSS, then the step 206 is performed. In step 206. if it is determined that the variable swnd is smaller than the MSS value (NO at step 206), the control loop via the step 208 is repeated. If a step of receiving an acknowledgment signal in the acknowledgment receiving processing 300 to be described later (see FIG. 4) is executed in the control loop via the step 208 and thereby the variable swnd is equal to or greater than the MSS value (YES at step 206), then the control goes to the step 207, in which the timer is reset and the operating procedure advances to the step 209. Similarly, when a timeout occurs (YES at step 208), the control also advances to the step 209.

In step 209, a variable seg is set to a size of data capable of being sent at this time, that is the minimum value selected among MSS, sdat and swnd. Then, the RTT measuring section 006 starts measurement of round trip time RTT for the segment to be sent from now on (step 210) and the segment of the set size seg is sent (step 211). After that, the variable swnd is updated by subtracting the set size seg from the variable swnd (step 212) and the variable sdat is updated by subtracting the set size seg from the variable sdat (step 213). After completion of the processing step 213, the control returns to the step 202 to start the sending process for the next segment.

Referring to FIG. 4, initialization is made at the time of system start-up (step 301) and it is determined whether an acknowledgment is received from the receiving side (step 302). The step 302 is repeated until an acknowledgment is received from the receiving side. When an acknowledgment is received from the receiving side, the RTT measuring section 006 stops measurement of RTT for the segment corresponding to the acknowledgment received (step 303).

Thereafter, the MSS calculator 005 calculates a maximum segment size MSS using the measured round trip time RTT and the bandwidth of the data link layer, for example, by referring the table as shown in FIG. 6 (step 304). Then, the congestion window size cwnd is updated (step 305).

The congestion window size cwnd, as described before, is used as an upper limit threshold of the MSS. For this purpose, the send window size swnd of the window controller 008 is updated by selecting the minimum from the current send window size swnd and the updated congestion window size cwnd (step 306). After completion of the processing step 306, the control returns to the step 302 to wait for arrival of the next acknowledgment.

As described above, an advantage of the present invention is to shorten the period of time during which data transfer is in a blocked state that may occur when a full send window of data is sent. This makes it possible to improve data transfer throughput.

In addition, the reduction in transfer time required can result in a reduction in power consumption or communication cost. Further, since data transfer is performed in the optimum size after an ACK from the receiving side is received, it is possible to achieve proper throughput compared to the conventional.

What is claimed is:

1. A method for controlling a packet size of data to be sent based on an acknowledgment from a receiving side, comprising the steps of:
   a) measuring a round trip time based on the acknowledgement received from the receiving side;
   b) determining a packet size of data to be sent based on the measured round trip time, a current bandwidth of a data link layer, and a current congestion window size, wherein the step (b) comprises the steps of:
      b.1) determining a maximum segment size depending on the measured round trip time and the current bandwidth of the data link layer, wherein the maximum segment size is determined so as to provide a maximum average data transfer throughput;
      b.2) limiting the maximum segment size to the current congestion window size to produce the packet size of data to be sent, and
   wherein, in the step (b.1), the maximum segment size is determined according to a predetermined relationship among a round trip time, a bandwidth of the data link layer, and an average data transfer throughput for each of a plurality of possible maximum segment sizes, wherein the predetermined relationship is previously obtained by performing data transfer simulation for each of the possible maximum segment sizes,
   wherein a largest one among the possible maximum segment sizes is selected when the measured round trip time is not greater than a predetermined value, and a smallest one among the possible maximum segment sizes is selected when the measured round trip time is greater than the predetermined value for a bandwidth of the data link layer.

2. A method for controlling a packet size of data to be sent based on an acknowledgment from a receiving side, comprising the steps of:
   a) measuring a round trip time based on the acknowledgement received from the receiving side;
   b) determining a maximum segment size depending on the measured round trip time and the current bandwidth of the data link layer, wherein the maximum segment size is determined so as to provide a maximum average data transfer throughput;
   c) updating a send window size so as to limit it to a current congestion window size;
   d) determining whether the maximum segment size becomes not greater than a not-yet-sent data size and the send window size within a predetermined timeout; and
   e) when the maximum segment size becomes not greater than the not-yet-sent data size and the send window size within the predetermined timeout or the predetermined timeout occurs, selecting a minimum one among the maximum segment size, the not-yet-sent data size, and the send window size as a packet size of data to be sent,
   wherein, in the step (b), the maximum segment size is determined according to a predetermined relationship among a round trip time, a bandwidth of the data link layer, and an average data transfer throughput for each of a plurality of possible maximum segment sizes, wherein the predetermined relationship is previously obtained by performing data transfer simulation for each of the possible maximum segment sizes,
   wherein a largest one among the possible maximum segment sizes is selected when the measured round trip time is not greater than a predetermined value, and a smallest one among the possible maximum segment sizes is selected when the measured round trip time is greater than the predetermined value for a bandwidth of the data link layer.

3. A device for controlling a packet size of data to be sent based on an acknowledgment from a receiving side, comprising:
   a send data buffer for storing transfer data received from outside;
   a window controller for controlling a send window size and a congestion window size of the transfer data stored in the send data buffer;
   a round trip time measuring section for measuring a round trip time by starting a timer when a packet is sent to the receiving side and stopping the timer when the acknowledgement for the packet is received from the receiving side; and
   a packet size determiner for determining a packet size of data to be sent based on the measured round trip time, a current bandwidth of a data link layer, and a current congestion window size,
   wherein the packet size determiner determines a maximum segment size depending on the measured round trip time and the current bandwidth of the data link layer wherein the maximum segment size is determined so as to provide a maximum average data transfer throughput, and limits the maximum segment size to the current congestion window size to produce the packet size of data to be sent,
   wherein the packet size determiner comprises:
   a table containing a predetermined relationship among a round trip time, a bandwidth of the data link layer, and an average data transfer throughput for each of a plurality of possible maximum segment sizes, wherein the predetermined relationship is previously obtained by performing data transfer simulation for each of the possible maximum segment sizes, wherein the maximum segment size is determined by referring to the table,
   wherein a largest one among the possible maximum segment sizes is selected when the measured round trip time is not greater than a predetermined value, and a smallest one among the possible maximum segment sizes is selected when the measured round trip time is greater than the predetermined value for a bandwidth of the data link layer.

* * * * *